(12) United States Patent
Suzuki et al.

(10) Patent No.: US 9,170,413 B2
(45) Date of Patent: Oct. 27, 2015

(54) MICROSCOPE OBJECTIVE LENS

(71) Applicant: Olympus Corporation, Tokyo (JP)

(72) Inventors: Yoshimasa Suzuki, Kanagawa (JP); Kazuo Kajitani, Tokyo (JP); Hisashi Goto, Tokyo (JP); Hisashi Ode, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 280 days.

(21) Appl. No.: 13/755,243

(22) Filed: Jan. 31, 2013

(65) Prior Publication Data

US 2013/0194660 A1    Aug. 1, 2013

(30) Foreign Application Priority Data

Jan. 31, 2012  (JP) .................................. 2012-018989
Dec. 12, 2012  (JP) .................................. 2012-271024

(51) Int. Cl.
*G02B 21/02*    (2006.01)

(52) U.S. Cl.
CPC ..................................... *G02B 21/02* (2013.01)

(58) Field of Classification Search
CPC ....... G02B 21/02; G02B 21/025; G02B 21/04
See application file for complete search history.

(56) References Cited

U.S. PATENT DOCUMENTS 5,216,545 A *    6/1993    Saito .............................. 359/661
2005/0117214 A1 *  6/2005  Wartmann et al. ............ 359/462

FOREIGN PATENT DOCUMENTS

JP    2006-065030    3/2006

* cited by examiner

*Primary Examiner* — Joseph P Martinez
(74) *Attorney, Agent, or Firm* — Kenyon & Kenyon LLP

(57) ABSTRACT

A microscope objective lens has an aspheric-surface lens, and a first lens nearest to an object side is a negative lens. It is desirable that at least any one surface of the first lens nearest to the object side is an aspheric surface. Moreover, it is desirable that the microscope objective lens satisfies the following conditional expression (1)

$$-20 < f_1/f < -0.1 \qquad (1)$$

where,
$f_1$ denotes a focal length of the first lens nearest to the object side, and
f denotes a focal length of the overall microscope objective lens system.

8 Claims, 21 Drawing Sheets

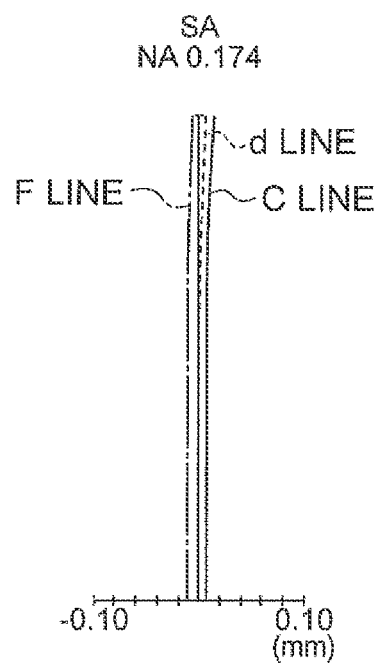
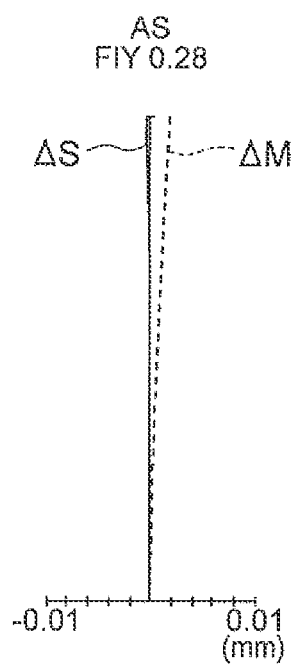
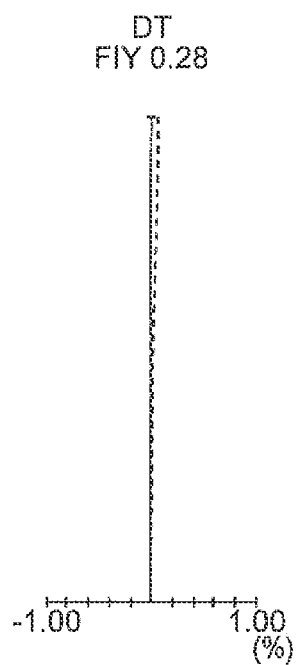
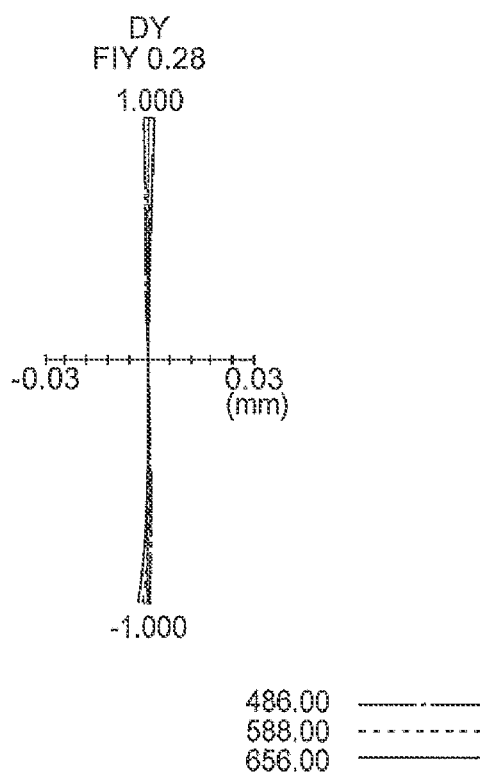

US 9,170,413 B2

MICROSCOPE OBJECTIVE LENS

CROSS-REFERENCE TO RELATED APPLICATION

The present application is based upon and claims the benefit of priority from the prior Japanese Patent Application Nos. 2012-018989 filed on Jan. 31, 2012 and 2012-271024 filed on Dec. 12, 2012; the entire contents of which are incorporated herein by reference.

BACKGROUND OF THE INVENTION

1. Field of the Invention

The present invention relates to a microscope objective lens.

2. Description of the Related Art

In microscope objective lenses heretofore, higher the magnification of a microscope objective lens, larger is the number of lenses used therein.

For example, in Japanese Patent Application Laid-open Publication No. 2006-65030, a microscope objective lens which includes 13 lenses has been disclosed. The abovementioned microscope objective lens is a microscope objective lens with a magnification of 40 times, NA (numerical aperture) of 0.9, and a focal length of 4.5 mm.

SUMMARY OF THE INVENTION

A microscope objective lens according to the present invention includes an aspheric-surface lens, and a first lens nearest to an object side is a negative lens.

Moreover, according to another aspect of the present invention, the microscope objective lens includes an aspheric-surface lens, and a first lens component nearest to the object side has a negative refractive power.

BRIEF DESCRIPTION OF THE DRAWINGS

FIG. 2 A, FIG. 2B, FIG. 2C, and FIG. 2D (hereinafter, 'FIG. 2A to FIG. 2D') are aberration diagrams of the microscope objective lens according to the first embodiment;

DETAILED DESCRIPTION OF THE INVENTION

Figure 1:
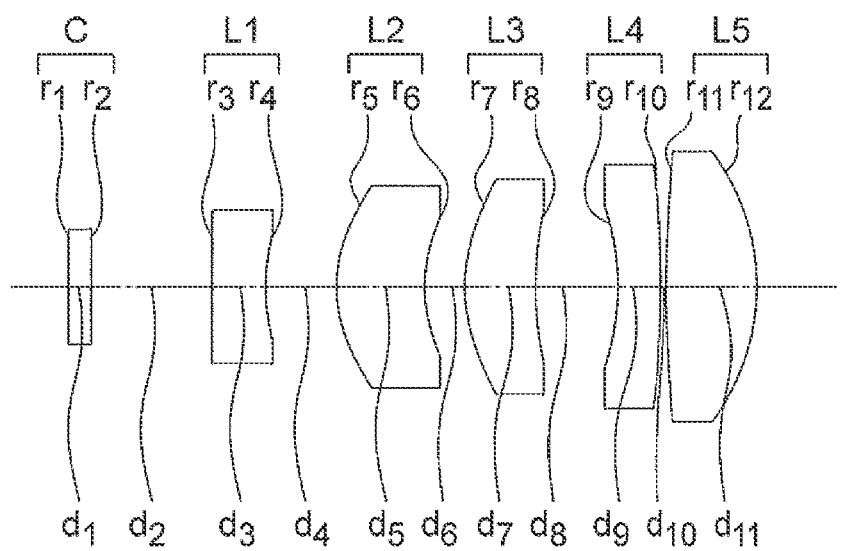
FIG. 1 is a lens cross-sectional view of a microscope objective lens according to a first embodiment of the present invention.

Exemplary embodiments of a microscope objective lens according to the present invention will be described below in detail by referring to the accompanying diagrams. However, the present invention is not restricted to the embodiments described below.

In the following description, an object side means a specimen (sample) side.

Moreover, a 'lens component' is let to be a lens body having only two surfaces in contact with air on an optical axis namely, an object-side surface and an image-side surface. Consequently, a lens body in which, a plurality of lenses is cemented is to be considered as a lens component.

A microscope objective lens according to an aspect of the present invention includes an aspheric-surface lens, and a first lens nearest to an object side is a negative lens.

The microscope objective lens according to the present invention, by having an aspheric-surface lens, shows the following effects (a), (b), and (c).

(a) It is possible to realize a microscope objective lens with a short overall length, which maintains a lens performance at center and a lens performance at periphery (distortion). Accordingly, since the overall length of the microscope objective lens is short, it is possible to reduce the total thickness of the lens, and an optical absorption in a glass material is suppressed, and a transmittance of the microscope objective lens is improved. Furthermore, it is possible to reduce auto fluorescence which is generated from a lens at the time of fluorescent observation.

(b) It is possible to make small an angle of incidence of a light ray of off-axis light. Accordingly, since a reflection at a lens surface becomes small, the transmittance of the objective lens becomes high.

(c) Since sufficient edge thickness is achieved, processing of the lens becomes easy.

By a lens nearest to the object side (specimen side) being a negative lens, when a positive lens is disposed on an image side of the lens nearest to the object side, a principal point on an image side of the microscope objective lens assumes a position away from a focal position. Therefore, it is possible to shorten an overall length with respect to the focal length of the microscope objective lens.

Moreover, in the microscope objective lens according to an aspect of the present invention, it is preferable that any one surface of the first lens nearest to the object side is an aspheric surface.

In the first lens, since an axial light ray and an off-axis light ray are mutually isolated (separated), when anyone surface of the first lens nearest to the object side is let to be an aspheric surface, it is possible to let to be a microscope objective lens with a short overall length, which maintains the lens performance at center and the lens performance at periphery (distortion).

Moreover, it is preferable that the microscope objective lens according to an aspect of the present invention satisfies the following conditional expression (1).

$$-20 < f_1/f < -0.1 \quad (1)$$

where, $f_1$ denotes a focal length of the first lens nearest to the object side, and f denotes a focal length of the overall microscope objective lens system.

Conditional expression (1) is a conditional expression which establishes a relationship between the focal length $f_1$ of the first lens nearest to the object side and the focal length f of the overall microscope objective lens system.

When a lower limit of conditional expression (1) is surpassed, since a refractive power of the first lens is weak, a position of a principal point on the image side of the microscope objective lens does not change much. Moreover, since it is not possible to shorten the overall length of the microscope objective lens, it is not possible to reduce (to make thin) the total thickness of lens.

When an upper limit of conditional expression (1) is surpassed, the refractive power of the first lens becomes excessively strong, and an amount of aberration which occurs is large.

It is more preferable that the microscope objective lens according to the present invention satisfies the following conditional expression (1') instead of conditional expression (1).

$$-5 < f_1/f < -0.2 \quad (1')$$

It is even more preferable that the microscope objective lens according to the present invention satisfies the following conditional expression (1") instead of conditional expression (1).

$$-3 < f_1/f < -0.3 \quad (1")$$

Moreover, an upper limit value or a lower limit value of conditional expression (1') may be let to be an upper limit value or a lower limit value of conditional expressions (1) and (1"), or an upper limit value or a lower limit value of conditional expression (1") may be let to be an upper limit value or a lower limit value of conditional expressions (1) and (1').

Moreover, a microscope objective lens according to an aspect of the present invention has an aspheric-surface lens, and a first lens component nearest to an object side has a negative refractive power.

The first lens component nearest to the object side has a negative refractive power means that, in a case in which, the first lens component nearest to the object side includes a single lens, the single lens has a negative refractive power.

In a case in which, the first lens component nearest to the object side includes a cemented lens, the cemented lens as a whole, has a negative refractive power.

Consequently, even when the cemented lens is tentatively disposed nearest to the object side and a lens nearest to the object side in the cemented lens has a negative refractive power, when the cemented lens as a whole has to have a positive refractive power, the first lens component nearest to the object side will have a positive refractive power.

By the lens component nearest to the object side (specimen side) having a negative refractive power, when a positive lens is disposed on an image side of the lens component nearest to the object side, a principal point on the image side of the microscope objective lens assumes a position away from the focal position. Therefore, it is possible to shorten the overall length with respect to the focal length of the microscope objective lens.

Moreover, in the first lens component, since an axial light ray and an off-axis light ray are mutually separated, when the lens is let to be an aspheric-surface lens, it is possible to let to be a microscope objective lens with a short overall length in which, the lens performance at center and the lens performance at periphery (distortion) are maintained.

Moreover, in the microscope objective lens according to an aspect of the present invention, it is preferable that at least any one surface of the first lens component nearest to the object side is an aspheric surface.

Since the axial light ray and the off-axis light ray are mutually separated in the first lens component, when at least any one surface is let to be an aspheric surface, it is possible to let to be a microscope objective lens with a short overall length in which, the lens performance at center and the lens performance at periphery (distortion) are maintained.

Moreover, it is preferable that the microscope objective lens according to an aspect of the present invention satisfies the following conditional expression (1A).

$$-20 < f_{1s}/f < -0.1 \quad (1A)$$

where, $f_{1s}$ denotes a combined focal length of the first lens component nearest to the object side, and f denotes a focal length of the overall microscope objective lens system.

Here, combined focal length means a focal length of a single lens when the first lens component is a single lens, and when the first lens component is a cemented lens, the combined focal length means a focal length of the overall cemented lens.

Conditional expression (1A) is a conditional expression which establishes a relationship between the combined focal length $f_{1S}$ of the first lens component nearest to the object side and the focal length f of the overall microscope objective lens system.

When a lower limit of conditional expression (1A) is surpassed, since a refractive power of the first lens component is weak, a position of a principal point on the image side of the microscope objective lens does not change much. Moreover, since it is not possible to shorten the overall length of the microscope objective lens, it is not possible to reduce the total thickness of the lens.

When an upper limit of conditional expression (1A) is surpassed, the refractive power of the first lens component becomes excessively strong, or in other words, the refractive power becomes excessively large, and an amount of aberration which occurs is large.

It is preferable that the microscope objective lens according to the aspect of the present invention satisfies the following conditional expression (1A') instead of conditional expression (1A).

$$-5 < f_{1S}/f < -0.2 \quad (1A')$$

It is more preferable that the microscope objective lens according to the aspect of the present invention satisfies the following conditional expression (1A'') instead of conditional expression (1A).

$$-3 < f_{1S}/f < -0.3 \quad (1A'')$$

Moreover, an upper limit value or a lower limit value of conditional expression (1A') may be let to be an upper limit value or a lower limit value of conditional expressions (1A) and (1A''), or an upper limit value or a lower limit value of conditional expression (1A'') may be let to be an upper limit value or a lower limit value of conditional expressions (1A) and (1A').

It is preferable that the microscope objective lens according to an aspect of the present invention satisfies the following conditional expression (2).

$$0.2 \text{ mm} < WD < 3.0 \text{ mm} \quad (2)$$

where,

WD denotes a distance from a front end of the microscope objective lens up to an object.

It is more preferable that the microscope objective lens satisfies the following conditional expression (2') instead of conditional expression (2).

$$0.4 \text{ mm} < WD < 2.0 \text{ mm} \quad (2')$$

It is even more preferable that the microscope objective lens satisfies the following conditional expression (2'') instead of conditional expression (2).

$$0.5 \text{ mm} < WD < 1.7 \text{ mm} \quad (2'')$$

An upper limit value or a lower limit value of conditional expression (2) may be let to be an upper limit value or a lower limit value of conditional expressions (2) and (2''), and, an upper limit value or a lower limit value of conditional expression (2'') may be let to be an upper limit value or a lower limit value of conditional expressions (2) and (2').

Conditional expression (2) is a conditional expression which regulates a distance from a front end of the microscope objective lens up to an object. The object means a specimen or a cover glass.

When a lower limit of conditional expression (2) is surpassed, since a working distance is short, it becomes difficult to operate. For instance, at the time of focusing the specimen, there is a possibility that the microscope objective lens makes a contact with the specimen, and damages the specimen.

When an upper limit of conditional expression (2) is surpassed, since the overall length of the microscope objective lens becomes long, the transmittance of the microscope objective lens is degraded.

It is preferable that the microscope objective lens according to an aspect of the present invention includes three to six lenses.

When the number of lenses becomes seven or more than seven, since the number of interfaces of lenses and air is large, the transmittance is degraded.

When the number of lenses becomes two or less than two, since the first lens is a negative lens, it is necessary to make the other lens to be a positive lens with a short focal length, and aberration occurs substantially due to the positive lens.

Moreover, in the microscope objective lens according to an aspect of the present invention, it is preferable that a lens which forms the microscope objective lens is made of at least two types of glass, and that a refractive index of the lens for a d-line is not more than 1.7. Accordingly, correction of a chromatic aberration becomes possible.

When the refractive index becomes 1.7 or higher than 1.7, a difference in a refractive index of a lens surface and a refractive index of an air surface becomes large, and a reflectivity of a lens surface becomes high. Therefore, the transmittance is degraded.

Moreover, in the microscope objective lens according to an aspect of the present invention, it is preferable that the microscope objective lens is accommodated in a microscope objective lens unit, and that the microscope objective lens unit has a detaching portion which is detachable from an observation apparatus.

A range of observation of a microscope is (given by a formula) field number/(focal length of tube lens/focal length of microscope objective lens), and by having the detaching portion, it is possible to detach from microscopes of various types.

Moreover, in the microscope objective lens according to an aspect of the present invention, it is preferable to calculate a parfocalizing distance PD of the microscope objective lens by the following expression (3).

$$PD = 45 + 15 \text{ m} \quad (3)$$

where, m is −1, 0, 1, 2, 3, or 4.

The parfocalizing distance PD is a parfocalizing distance in a case of no cover glass, and a parfocalizing distance in a case of having a cover glass is given by adding t (n−1/n) to the parfocalizing distance PD in the case of no cover glass. Here, t denotes a thickness of the cover glass, and n denotes a refractive index of the cover glass.

Since the parfocalizing distance calculated by the above-mentioned expression (3) is same as a parfocalizing distance of the existing microscope objective lens, even when the microscope objective lens according to the present invention is selected, it is possible to focus at a specimen all the time.

Exemplary embodiments of the microscope objective lens according to the present invention will be described below in detail by referring to the accompanying diagrams. However, the present invention is not restricted to the embodiments described below.

Figure 19:
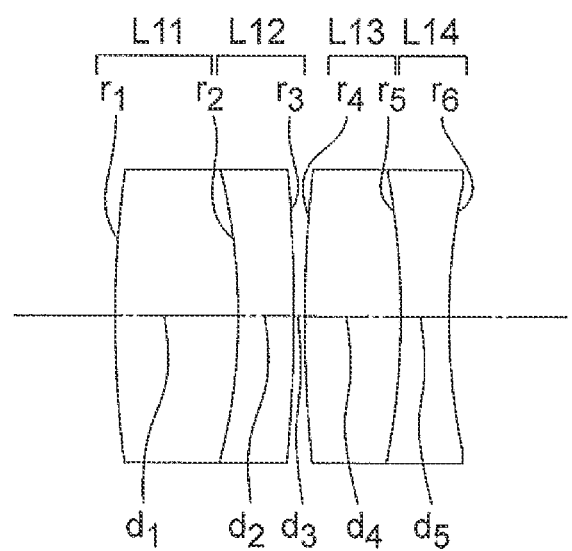
FIG. 19 is a cross-sectional view of a tube lens.
Figure 20:
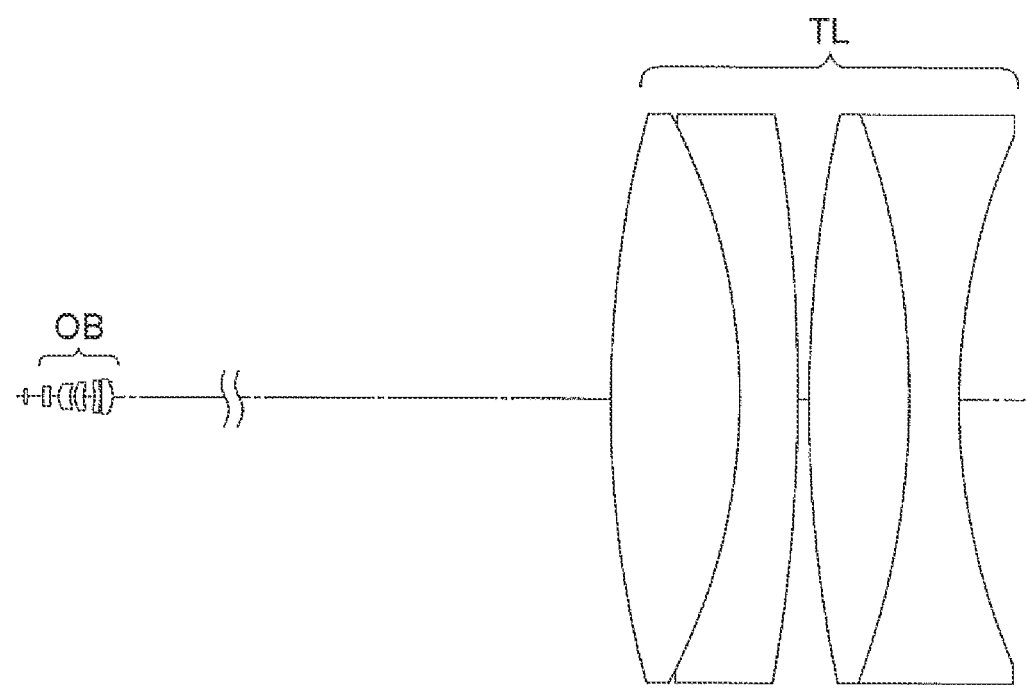
FIG. 20 is a lens cross-sectional view when the tube lens and the microscope objective lens according to the first embodiment are combined.

A first embodiment, a second embodiment, a third embodiment, a fourth embodiment, a fifth embodiment, a sixth embodiment, a seventh embodiment, an eighth embodiment, and a ninth embodiment (hereinafter, 'embodiments from the first embodiment to the ninth embodiment') of the microscope objective lens according to the present invention will be described below. Lens cross-sectional views of microscope objective lenses according to the embodiments from the first embodiment to the ninth embodiment are shown in FIG. 1, FIG. 3, FIG. 5, FIG. 7, FIG. 9, FIG. 11, FIG. 13, FIG. 15, and FIG. 17 respectively. In these lens cross-sectional views, L1, L2, L3, L4, L5, and L6 denote lenses, and C denotes a cover glass. Moreover, FIG. 19 is a cross-sectional view of a tube lens, and FIG. 20 is a lens cross-sectional view when the tube lens and the microscope objective lens according to the present invention are combined. In FIG. 20, OB denotes an objective lens, and TL denotes the tube lens.

The microscope objective lenses according to the embodiments from the first embodiment to the ninth embodiment are infinity-corrected microscope objective lenses. In the infinity-corrected microscope objective lenses, since a light beam which is emerged from the microscope objective lens becomes parallel, image is not formed in (by) the microscope objective lens. Therefore, a parallel light beam is converged at (in) the tube lens as shown in FIG. 19 for instance, and an image of a specimen surface is formed at a position where the parallel beam is converged.

A microscope objective lens according to the first embodiment, as shown in FIG. 1, includes in order from an object side, a biconcave negative lens L1, a positive meniscus lens L2 having a convex surface directed toward the object side, a positive meniscus lens L3 having a convex surface directed toward the object side, a negative meniscus lens L4 having a convex surface directed toward an image side, and a biconvex positive lens L5.

In each embodiment, a first surface r1 is a specimen surface.

An aspheric surface is used for a total of 10 surfaces namely, both surfaces of the biconcave negative lens L1, both surfaces of the positive meniscus lens L2, both surfaces of the positive meniscus lens L3, both surfaces of the negative meniscus lens L4, and both surfaces of the biconvex positive lens L5.

Figure 3:
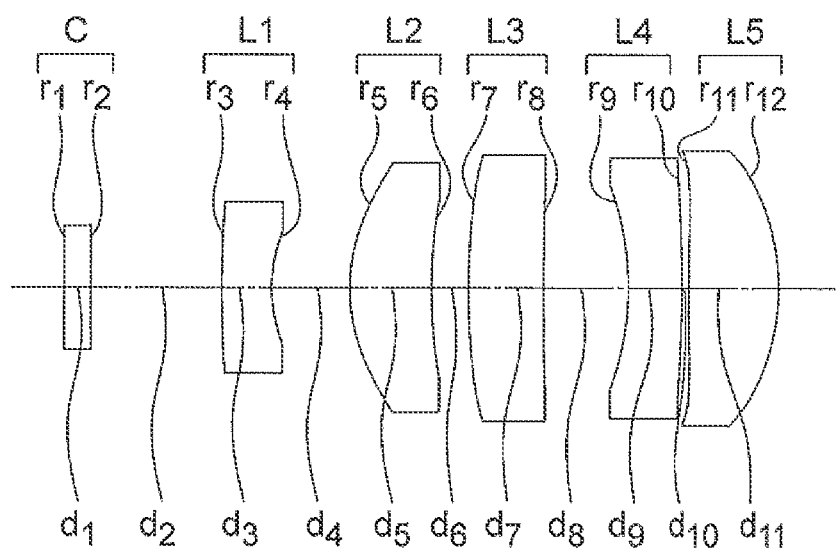
FIG. 3 is a lens cross-sectional view of a microscope objective lens according to a second embodiment of the present invention.

A microscope objective lens according to the second embodiment, as shown in FIG. 3, includes a negative meniscus lens L1 having a convex surface directed toward an object side, a positive meniscus lens L2 having a convex surface directed toward the object side, a positive meniscus lens L3 having a convex surface directed toward the object side, a negative meniscus lens L4 having a convex surface directed toward an image side, and a biconvex positive lens L5.

An aspheric surface is used for a total of 10 surfaces namely, both surfaces of the negative meniscus lens L1, both surfaces of the positive meniscus lens L2, both surfaces of the positive meniscus lens L3, both surfaces of the negative meniscus lens L4, and both surfaces of the biconvex positive lens L5.

Figure 5:
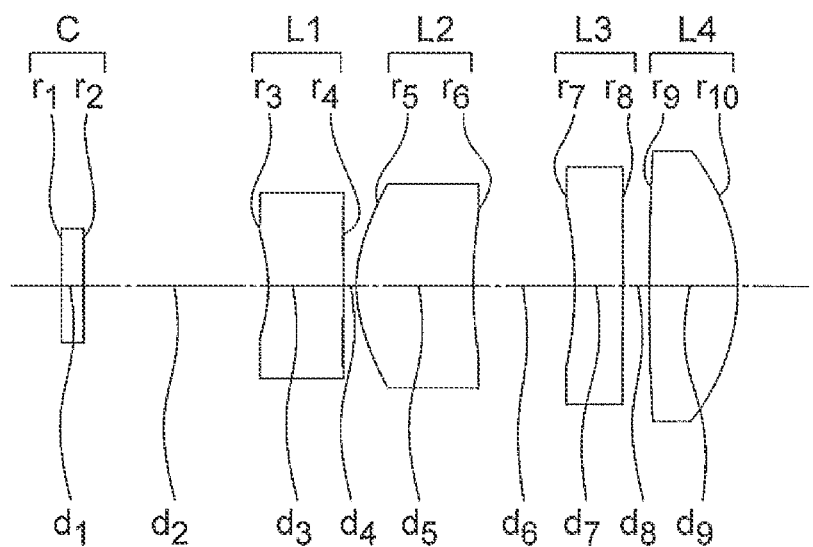
FIG. 5 is a lens cross-sectional view of a microscope objective lens according to a third embodiment of the present invention.

A microscope objective lens according to the third embodiment, as shown in FIG. 5, includes a negative meniscus lens L1 having a convex surface directed toward an image side, a positive meniscus lens L2 having a convex surface directed toward an object side, a negative meniscus lens L3 having a convex surface directed toward the image side, and a biconvex positive lens L4.

An aspheric surface is used for a total of six surfaces namely, both surfaces of the negative meniscus lens L1, both surfaces of the positive meniscus lens L2, and both surfaces of the negative meniscus lens L3.

Figure 7:
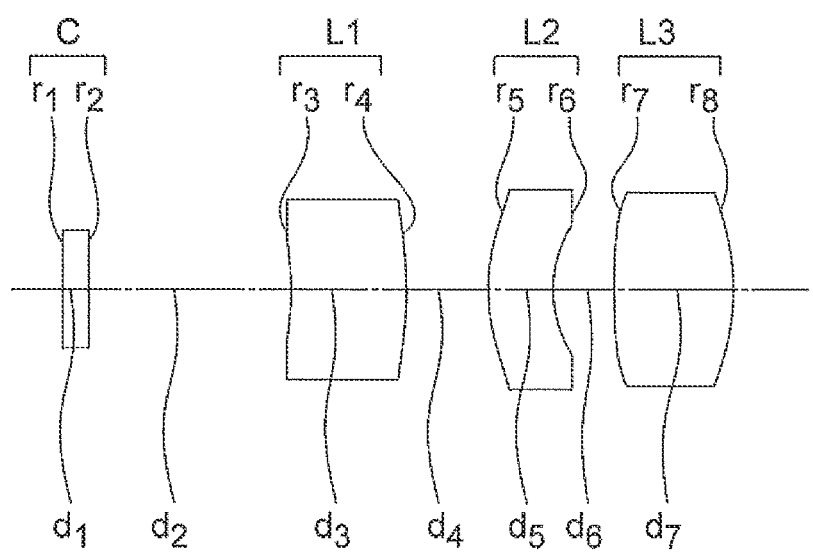
FIG. 7 is a lens cross-sectional view of a microscope objective lens according to a fourth embodiment of the present invention.
Figure 8A:
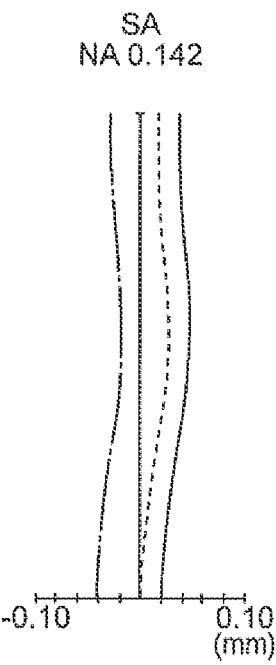
FIG. 8A, FIG. 8B, FIG. 8C, and FIG. 8D (hereinafter, 'FIG. 8A to FIG. 8D') are aberration diagrams of the microscope objective lens according to the fourth embodiment.
Figure 8B:
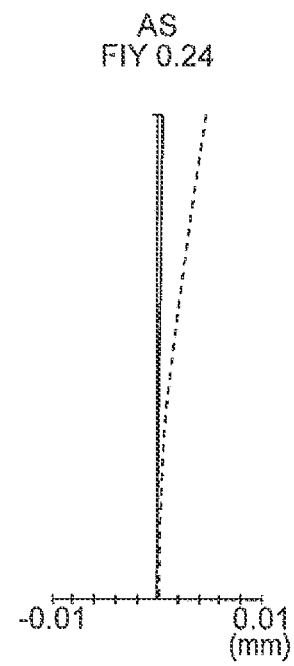
Figure 8C:
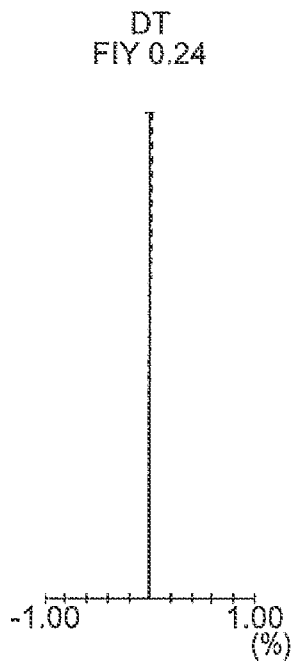
Figure 8D:
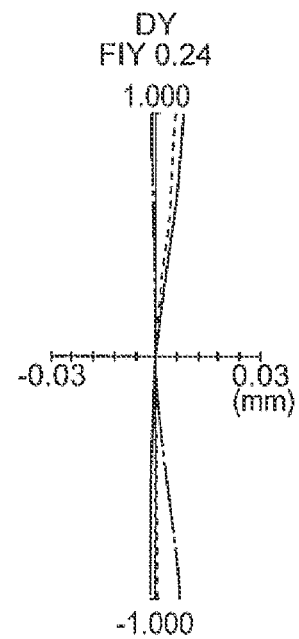

A microscope objective lens according to the fourth embodiment, as shown in FIG. 7, includes a negative meniscus lens L1 having a convex surface directed toward an image side, a negative meniscus lens L2 having a convex surface directed toward an object side, and a biconvex positive lens L3.

An aspheric surface is used for a total of six surfaces namely, both surfaces of the negative meniscus lens L1, both surfaces of the negative meniscus lens L2, and both surfaces of the biconvex positive lens L3.

Figure 9:
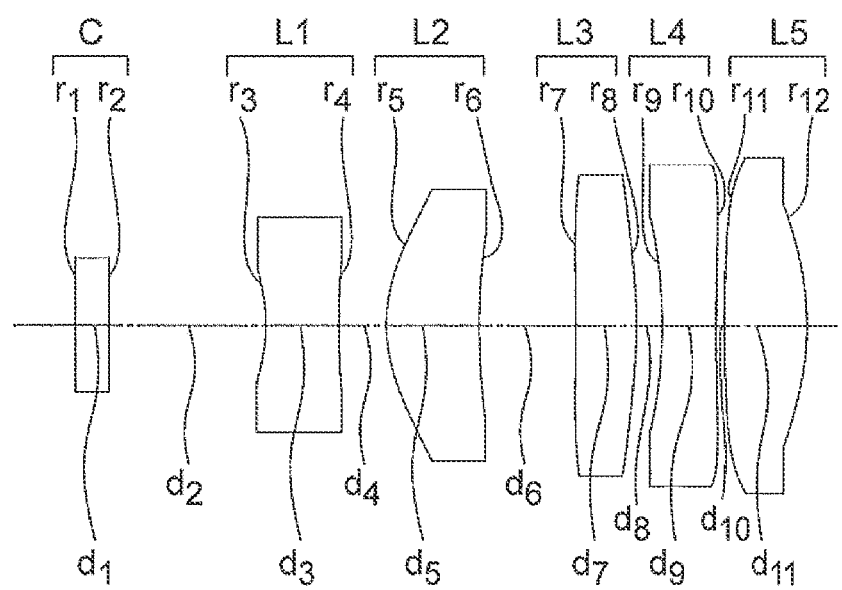
FIG. 9 is a lens cross-sectional view of a microscope objective lens according to a fifth embodiment of the present invention.
Figure 10A:
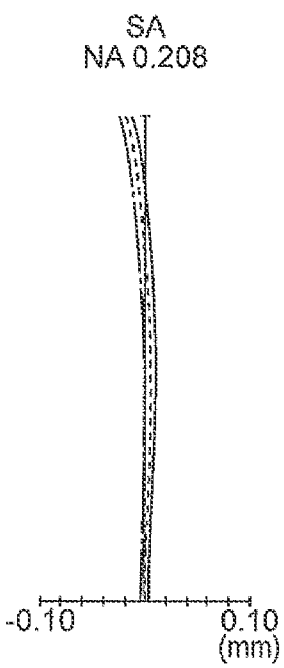
FIG. 10A, FIG. 10B, FIG. 10C, and FIG. 10D (hereinafter, 'FIG. 10A to FIG. 10D') are aberration diagrams of the microscope objective lens according to the fifth embodiment.
Figure 10B:
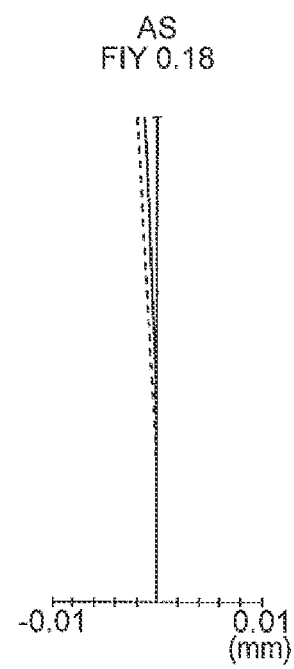
Figure 10C:
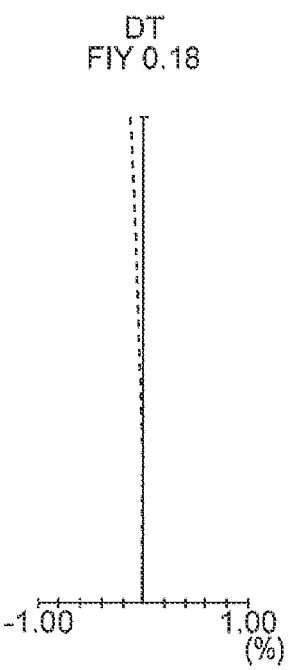
Figure 10D:
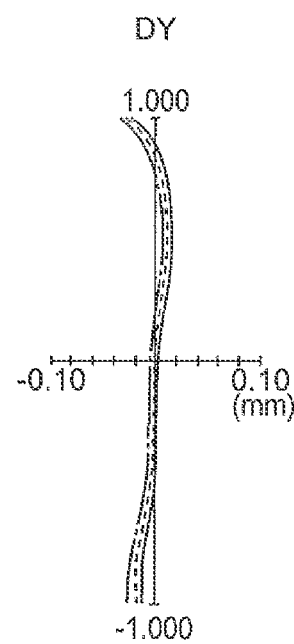

A microscope objective lens according to the fifth embodiment, as shown in FIG. 9, includes a biconcave negative lens L1, a positive meniscus lens L2 having a convex surface directed toward an object side, a positive meniscus lens L3 having a convex surface directed toward an image side, a biconcave negative lens L4, and a biconvex positive lens L5.

An aspheric surface is used for a total of 10 surfaces namely, both surfaces of the biconcave negative lens L1, both surfaces of the positive meniscus lens L2, both surfaces of the positive meniscus lens L3, both surfaces of the biconcave negative lens L4, and both surfaces of the biconvex positive lens L5.

Figure 11:
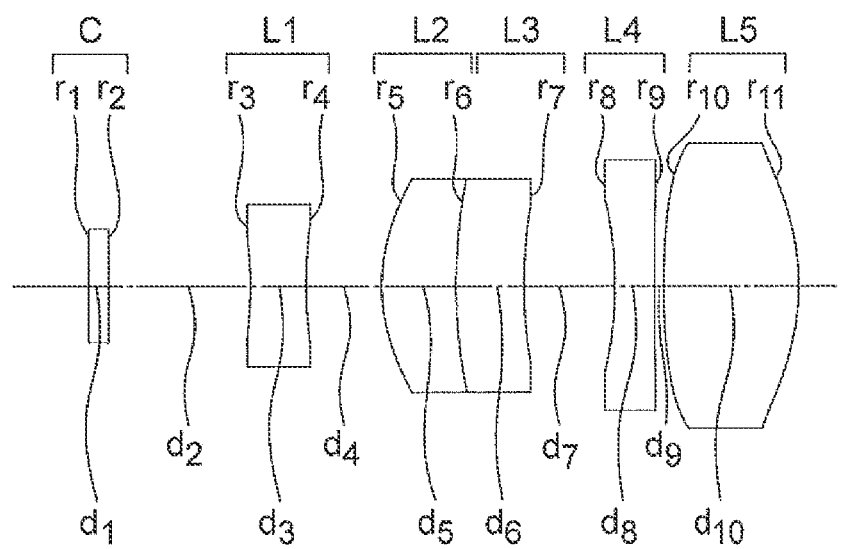
FIG. 11 is a lens cross-sectional view of a microscope objective lens according to a sixth embodiment of the present invention.
Figure 12A:
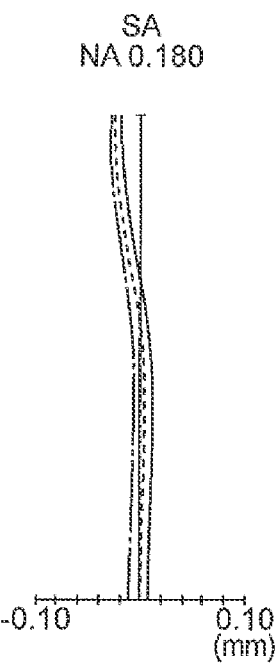
FIG. 12A, FIG. 12B, FIG. 12C, and FIG. 12D (hereinafter, 'FIG. 12A to FIG. 12D') are aberration diagrams of the microscope objective lens according to the sixth embodiment.
Figure 12B:
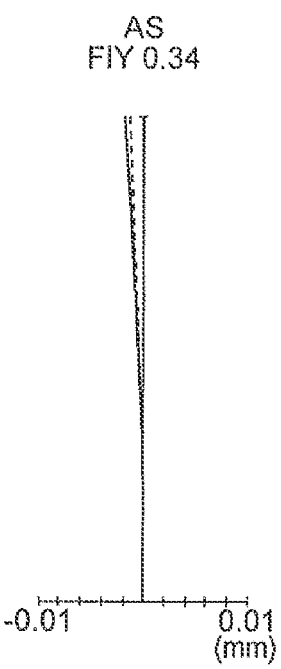
Figure 12C:
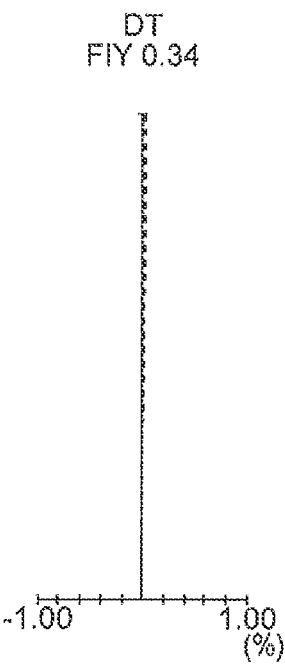
Figure 12D:
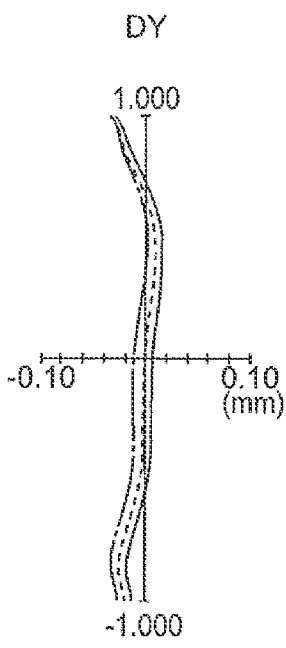

A microscope objective lens according to the sixth embodiment, as shown in FIG. 11, includes a biconcave negative lens L1, a cemented lens of a positive meniscus lens L2 having a convex surface directed toward an object side and a negative meniscus lens L3 having a convex surface directed toward the object side, a biconcave negative lens L4, and a biconvex positive lens L5.

An aspheric surface is used for a total of nine surfaces namely, both surfaces of the biconcave negative lens L1, a surface on the object side of the positive meniscus lens L2, a cemented surface of the positive meniscus lens L2 and the negative meniscus lens L3, a surface on an image side of the negative meniscus lens L3, both surfaces of the biconcave negative lens L4, and both surfaces of the biconvex positive lens L5.

Figure 13:
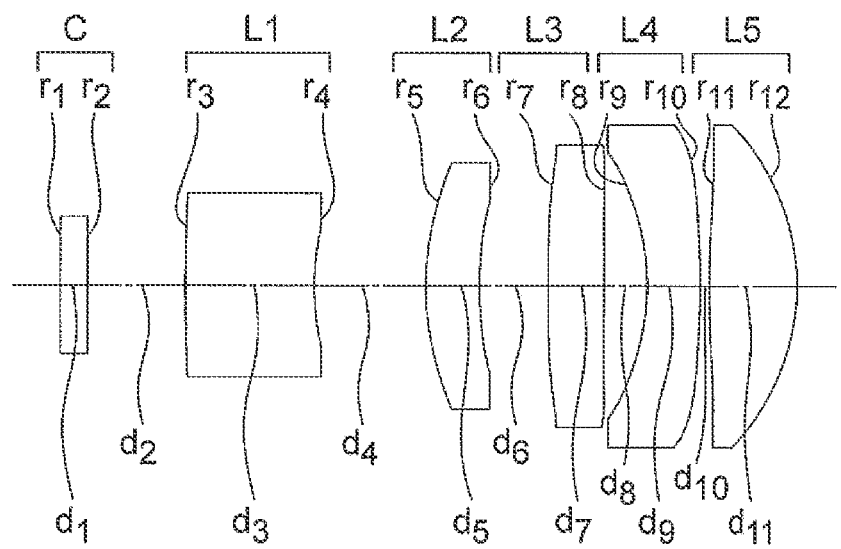
FIG. 13 is a lens cross-sectional view of a microscope objective lens according to a seventh embodiment of the present invention.
Figure 14A:
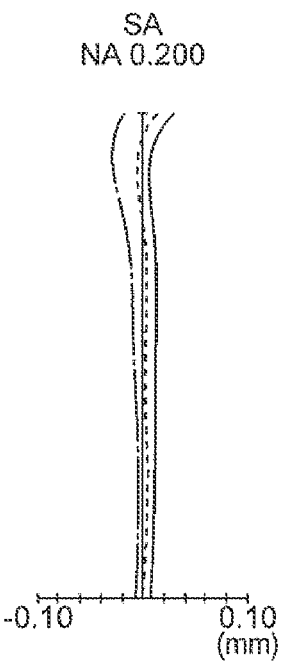
FIG. 14A, FIG. 14B, FIG. 14C, and FIG. 14D (hereinafter, 'FIG. 14A to FIG. 14B') are aberration diagrams of the microscope objective lens according to the seventh embodiment.
Figure 14B:
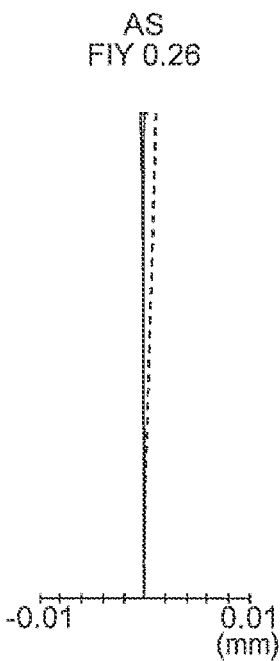
Figure 14C:
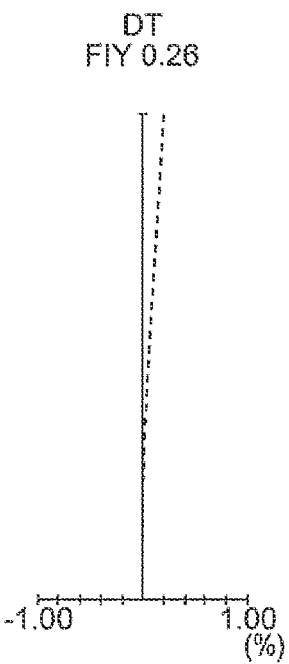
Figure 14D:
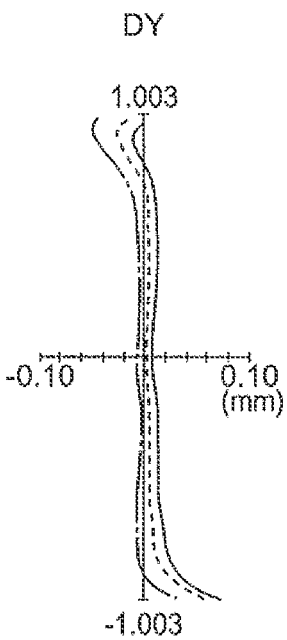

A microscope objective lens according to the seventh embodiment, as shown in FIG. 13, includes a negative meniscus lens L1 having a convex surface directed toward an object side, a positive meniscus lens L2 having a convex surface directed toward the object side, a biconvex positive lens L3, a negative meniscus lens L4 having a convex surface directed toward an image side, and a biconvex positive lens L5.

An aspheric surface is used for a total of 10 surfaces namely, both surfaces of the negative meniscus lens L1, both surfaces of the positive meniscus lens L2, both surfaces of the biconvex positive lens L3, both surfaces of the negative meniscus lens L4, and both surfaces of the biconvex positive lens L5.

Figure 15:
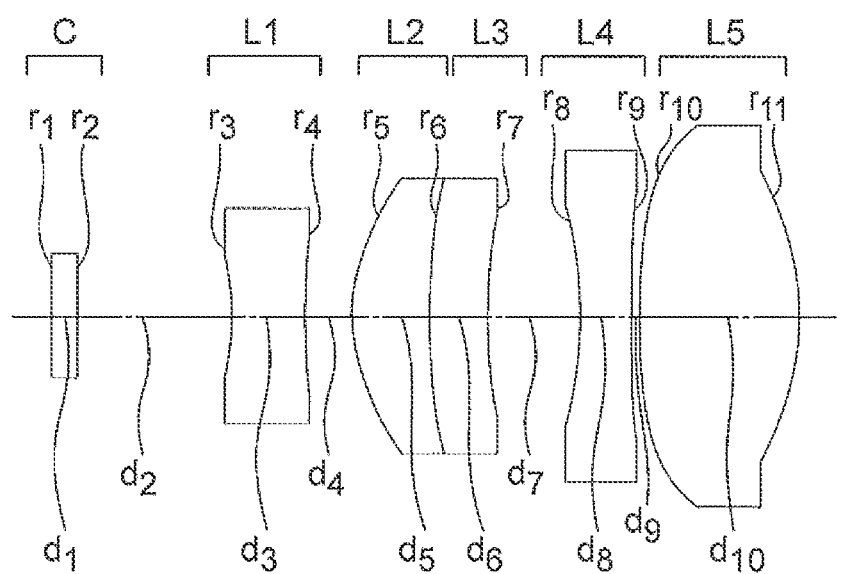
FIG. 15 is a lens cross-sectional view of a microscope objective lens according to an eighth embodiment of the present invention.
Figure 16A:
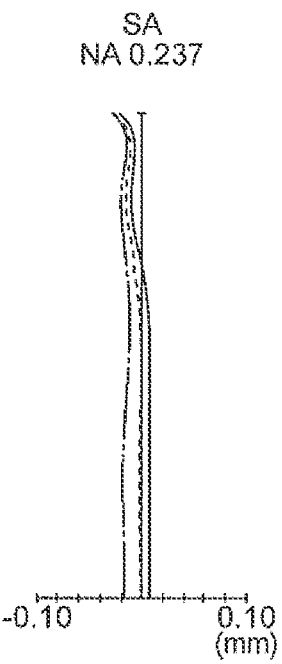
FIG. 16A, FIG. 16B, FIG. 16C, and FIG. 16D (hereinafter, 'FIG. 16A to FIG. 16D') are aberration diagrams of the microscope objective lens according to the eighth embodiment.
Figure 16B:
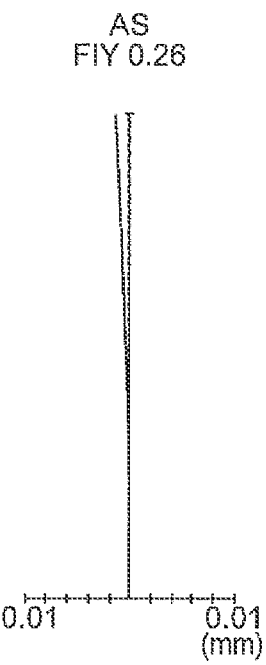
Figure 16C:
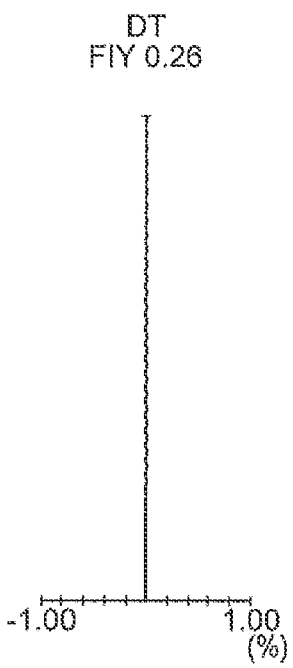
Figure 16D:
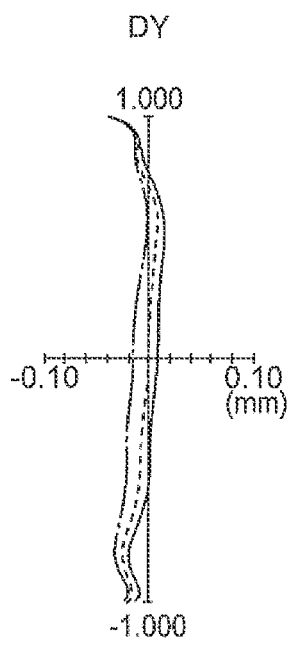

A microscope objective lens according to the eighth embodiment, as shown in FIG. 15, includes a biconcave negative lens L1, a cemented lens of a positive meniscus lens L2 having a convex surface directed toward an object side and a negative meniscus lens L3 having a convex surface directed toward the object side, a biconcave negative lens L4, and a biconvex positive lens L5.

An aspheric surface is used for a total of nine surfaces namely, both surfaces of the biconcave negative lens L1, a surface on the object side of the positive meniscus lens L2, a cemented surface of the positive meniscus lens L2 and the negative meniscus lens L3, a surface on an image side of the negative meniscus lens L3, both surfaces of the biconcave negative lens L4, and both surfaces of the biconvex positive lens L5.

Figure 17:
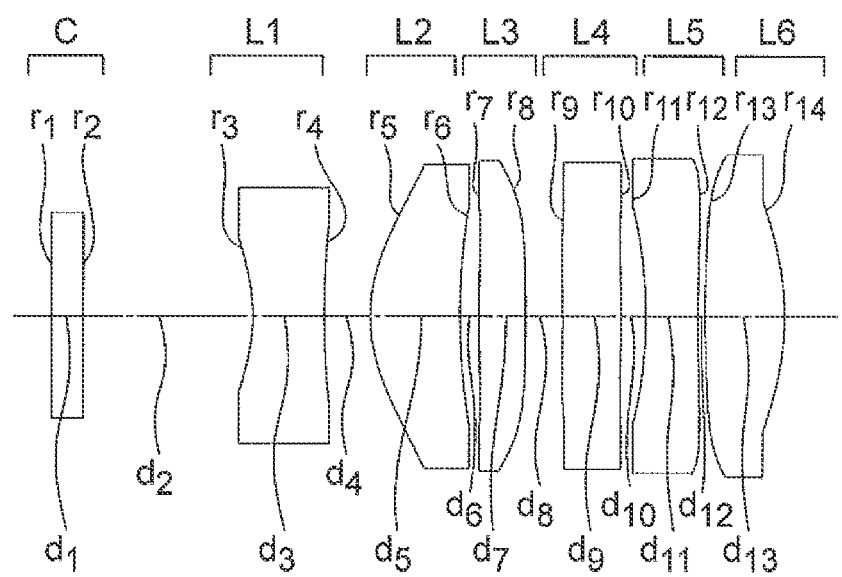
FIG. 17 is a lens cross-sectional view of a microscope objective lens according to a ninth embodiment of the present invention.

A microscope objective lens according to the ninth embodiment, as shown in FIG. 17, includes a biconcave negative lens L1, a positive meniscus lens L2 having a convex surface directed toward an object side, a biconvex positive lens L3, a positive meniscus lens L4 having a convex surface directed toward an image side, a biconcave negative lens L5, and a biconvex positive lens L6.

An aspheric surface is used for a total of 12 surfaces namely, both surfaces of the biconcave negative lens L1, both surfaces of the positive meniscus lens L2, both surfaces of the biconvex positive lens L3, both surfaces of the positive meniscus lens L4, both surfaces of the biconcave negative lens L5, and both surfaces of the biconvex positive lens L6.

The tube lens, as shown in FIG. 19, includes a biconvex lens L11, a negative meniscus lens L12 having a convex surface directed toward an image side, a biconvex lens L13, and a biconcave negative lens L14. The biconvex lens L11 and the negative meniscus lens L12 are cemented. Moreover, the biconvex lens L13 and the biconcave negative lens L14 are cemented.

Numerical data of each embodiment described above is shown below. Apart from symbols described above, r denotes radius of curvature of each lens surface, d denotes a distance between two lenses, nd denotes a refractive index of each lens for a d-line, vd1 denotes an Abbe constant for each lens. f denotes a focal length of the entire zoom lens system, NA denotes a numerical aperture of lens of object-side, $F_{NO}$ denotes an F number, ω denotes a half angle of field, WD denotes a working distance. Further, * denotes an aspheric data.

When x is let to be an optical axis with a direction of traveling of light as a positive (direction), and y is let to be in a direction orthogonal to the optical axis, a shape of the aspheric surface is described by the following expression.

$$x=(y^2/R)/[1+\{1-(K+1)(y/R)^2\}^{1/2}]+A_4y^4+A_6y^6+A_8y^8+A_{10}y^{10}+A_{12}y^{12}$$

where, R denotes a paraxial radius of curvature, K denotes a conical coefficient, A4, A6, A8, A10, and $A_{12}$ denote aspherical surface coefficients of a fourth order, a sixth order, an eight order, a tenth order, and a twelfth order respectively. Moreover, in the aspherical surface coefficients, 'e–n' (where, n is an integral number) indicates '$10^{-n}$'.

Hereinafter "ob" denotes object plane.

Example 1

| Unit mm | | | | |
|---|---|---|---|---|
| Surface data | | | | |
| Surface no. | r | d | nd | vd |
| 1 (ob) | ∞ | 0.17 | 1.5163 | 64.1 |
| 2 | ∞ | 0.93 | | |
| 3* | −39.28 | 0.41 | 1.5307 | 55.7 |
| 4* | 1.58 | 0.55 | | |
| 5* | 1.08 | 0.69 | 1.5307 | 55.7 |
| 6* | 1.16 | 0.31 | | |
| 7* | 1.27 | 0.55 | 1.5307 | 55.7 |
| 8* | 2.82 | 0.63 | | |
| 9* | −2.01 | 0.33 | 1.6349 | 23.9 |
| 10* | −7.77 | 0.04 | | |
| 11* | 8.27 | 0.70 | 1.5307 | 55.7 |
| 12* | −1.74 | | | |

Aspherical surface data

3rd surface k = 1.5000e+001
a = 1.5292e−002, b = −2.6082e−003, c = 6.9681e−004,
d = −3.0641e−005
4th surface k = −8.1764e−001
a = −7.7369e−002, b = 1.0338e−002, c = 1.0829e−004,
d = −9.8389e−005
5th surface k = −1.2590e+000
a = −1.7655e−002, b = −2.5790e−003
6th surface k = −8.6895e−001
a = −1.0585e−001, b = 1.7929e−002, c = 1.6927e−003

-continued

| Unit mm |
|---|
| 7th surface | k = −1.5753e+000
a = −4.1155e−002, b = 1.4678e−002
8th surface k = 1.3514e+000
a = 1.7655e−002, b = −3.3527e−003
9th surface k = 1.5046e+000
a = 5.3763e−002, b = −2.9705e−002, c = −6.9808e−004
10th surface k = 3.5929e+000
a = 3.4244e−002, b = −3.2268e−002, c = −2.1329e−003
11th surface k = −5.0000e+000
a = −1.3838e−002, b = −5.7848e−004, c = 4.1265e−004
12th surface k = −1.1539e+000
a = −2.5780e−002, b = −2.2360e−003, c = 3.7672e−003

| Focal length | 4.5 |
|---|---|
| NA | 0.17 |
| WD | 0.93 |
| Maximum image height | 0.28 |

Example 2

| Unit mm | | | | |
|---|---|---|---|---|
| Surface data | | | | |
| Surface no. | r | d | nd | vd |
| 1 (ob) | ∞ | 0.17 | 1.5163 | 64.1 |
| 2 | ∞ | 1.10 | | |
| 3* | 9.58 | 0.37 | 1.5337 | 55.9 |
| 4* | 1.20 | 0.63 | | |
| 5* | 1.43 | 0.66 | 1.5446 | 56.0 |
| 6* | 4.75 | 0.31 | | |
| 7* | 6.27 | 0.61 | 1.5446 | 56.0 |
| 8* | 55.42 | 0.69 | | |
| 9* | −2.22 | 0.43 | 1.6142 | 25.6 |
| 10* | −10.83 | 0.06 | | |
| 11* | 15.52 | 0.72 | 1.5337 | 55.9 |
| 12* | −1.93 | | | |

Aspherical surface data

3rd surface k = −2.2071e+002
a = 1.3211e−002, b = −8.2349e−004, c = 2.0830e−004,
d = −4.7133e−006, e = −1.0299e−006, f = 8.7247e−008,
g = −9.5085e−010
4th surface k = −1.6336e+000
a = −2.8064e−002, b = 2.8170e−003, c = −2.0563e−004,
d = −1.9198e−005, e = 2.9801e−006, f = −4.5050e−008,
g = 1.3259e−008
5th surface k = −5.7921e−001
a = −1.0702e−002, b = −2.5916e−002, c = 4.2975e−003,
d = −3.7653e−004, e = −1.4533e−005, f = −1.4245e−006,
g = 7.7289e−007

-continued

Unit mm

6th surface k = 2.4836e−001
a = 3.2573e−002, b = −3.3138e−002, c = 2.5668e−002,
d = −5.7221e−003, e = 3.0196e−004, f = −1.5543e−005,
g = −1.2315e−005
7th surface k = −3.9383e+000
a = −6.7509e−003, b = 2.0564e−002, c = 3.5887e−003,
d = −3.0518e−003, e = −4.9395e−005, f = −9.4424e−006,
g = 1.4299e−006
8th surface k = −3.8964e+002
a = 1.0676e−002, b = 1.1249e−002, c = −9.4845e−003, d = 1.2875e−003,
e = −6.1447e−005, f = −5.6834e−005, g = 1.0704e−004
9th surface k = 1.4272e+000
a = 4.1289e−002, b = −1.6301e−002, c = 1.4390e−002,
d = −6.2550e−004, e = 1.3290e−003, f = 4.5438e−004,
g = −1.6981e−003
10th surface k = −1.5658e+002
a = −1.4678e−002, b = 3.2408e−002, c = −2.5992e−002,
d = 5.0919e−003, e = 2.6945e−003, f = 4.2757e−003, g = −2.9207e−003
11th surface k = −3.8871e+002
a = −3.3433e−002, b = 1.6018e−002, c = −1.8520e−002,
d = −1.1819e−003, e = −3.7513e−003, f = −4.9674e−003,
g = 3.2479e−003
12th surface k = 2.6646e−001
a = −4.1496e−003, b = 3.6642e−003, c = −9.0048e−003,
d = −9.5081e−005, e = 5.1015e−004, f = 4.2305e−004,
g = −1.9400e−003

| | |
|---|---|
| Focal length | 5.0 |
| NA | 0.21 |
| WD | 1.10 |
| Maximum image height | 0.30 |

Example 3

Unit mm

Surface data

| Surface no. | r | d | nd | νd |
|---|---|---|---|---|
| 1 (ob) | ∞ | 0.17 | 1.5163 | 64.1 |
| 2 | ∞ | 1.41 | | |
| 3* | −1.09 | 0.59 | 1.5247 | 56.4 |
| 4* | −15.96 | 0.10 | | |
| 5* | 1.04 | 0.91 | 1.5247 | 56.4 |
| 6* | 3.91 | 0.78 | | |
| 7* | −3.17 | 0.37 | 1.6070 | 27.6 |
| 8* | −26.96 | 0.20 | | |
| 9 | 20.00 | 0.69 | 1.4845 | 70.2 |
| 10 | −1.70 | | | |

Aspherical surface data

3rd surface k = −6.9786e+000
a = 6.3761e−002, b = −1.8935e−002, c = 5.0398e−003,
d = −7.1260e−004, e = 4.5015e−005

-continued

Unit mm

4th surface k = 3.1388e+001
a = 7.7831e−002, b = −1.9566e−002, c = 8.0390e−004,
d = 3.7556e−004, e = −4.4489e−005
5th surface k = −4.3135e+000
a = 5.7351e−002, b = −3.6453e−002, c = 1.7406e−002,
d = −7.9964e−003, e = 1.1960e−003
6th surface k = −1.8788e+001
a = 1.9904e−002, b = 1.9157e−002, c = −1.0712e−002,
d = 6.1387e−003
7th surface k = −3.1804e+000
a = −1.0317e−002, b = 8.5494e−003, c = −1.5358e−002,
d = −1.1944e−003, e = −4.1261e−003
8th surface k = 0.0000e+000
a = 2.6155e−002, b = 2.1272e−002, c = −3.8343e−002

| | |
|---|---|
| Focal length | 4.5 |
| NA | 0.17 |
| WD | 1.41 |
| Maximum image height | 0.28 |

Example 4

Unit mm

Surface data

| Surface no. | r | d | nd | νd |
|---|---|---|---|---|
| 1 (ob) | ∞ | 0.17 | 1.5163 | 64.1 |
| 2 | ∞ | 1.39 | | |
| 3* | −1.95 | 0.78 | 1.5300 | 56.2 |
| 4* | −2.35 | 0.56 | | |
| 5* | 1.31 | 0.44 | 1.5750 | 39.0 |
| 6* | 0.81 | 0.42 | | |
| 7* | 6.59 | 0.81 | 1.5300 | 56.2 |
| 8* | −1.61 | | | |

Aspherical surface data

3rd surface k = −1.0449e+001
a = 5.5882e−002, b = −1.3350e−002, c = 2.6973e−003,
d = −1.0012e−004
4th surface k = −1.6403e+001
a = 6.9137e−002, b = −3.4070e−002, c = 1.1627e−002,
d = −1.5912e−003
5th surface k = −9.3960e−001
a = −3.6455e−002, b = −3.0444e−001, c = 3.8188e−003,
d = 6.7536e−002
6th surface k = −9.7480e−001
a = 9.8250e−002, b = −3.8374e−001, c = 3.9960e−001,
d = −1.0609e−001
7th surface k = −1.0445e+000
a = 1.8012e−001, b = 1.3582e−001, c = 8.8920e−002,
d = −1.5580e−002

-continued

Unit mm

8th surface k = 2.8889e−001
a = 5.2987e−002, b = −3.7558e−002, c = 2.3123e−001,
d = 5.2485e−003

| Focal length | 4 |
| NA | 0.14 |
| WD | 1.39 |
| Maximum image height | 0.24 |

Example 5

Unit mm

Surface data

| Surface no. | r | d | nd | vd |
|---|---|---|---|---|
| 1 (ob) | ∞ | 0.17 | 1.5163 | 64.1 |
| 2 | ∞ | 0.79 | | |
| 3* | −0.90 | 0.38 | 1.5346 | 56.2 |
| 4* | 4.23 | 0.24 | | |
| 5* | 0.77 | 0.48 | 1.5346 | 56.2 |
| 6* | 3.40 | 0.49 | | |
| 7* | −14.41 | 0.31 | 1.5346 | 56.2 |
| 8* | −2.73 | 0.13 | | |
| 9* | −2.47 | 0.27 | 1.6142 | 25.6 |
| 10* | 11.08 | 0.04 | | |
| 11* | 10.28 | 0.42 | 1.5346 | 56.2 |
| 12* | −1.54 | | | |

Aspherical surface data

3rd surface k = −7.2952e+000
a = 8.2593e−002, b = −3.8628e−002, c = 1.1216e−002,
d = −1.6482e−003, e = 9.3301e−005, f = 9.1826e−007
4th surface k = −8.4623e+001
a = 1.0703e−001, b = −4.8837e−002, c = 3.2315e−003,
d = 1.2418e−003, e = −3.7604e−005, f = −2.2653e−005
5th surface k = −3.5235e+000
a = 7.4952e−002, b = −1.0607e−001, c = −3.4672e−002,
d = 5.2016e−002, e = −1.0626e−002
6th surface k = −9.7572e+000
a = 2.0008e−002, b = −2.0028e−002, c = 6.8054e−004,
d = 7.8958e−002, e = −3.9562e−002
7th surface k = 3.7214e−001
a = 1.0621e−001, b = −9.4595e−003, c = 2.0391e−001,
d = −3.1096e−001
8th surface k = −4.5023e+001
a = −1.1555e−002, b = 1.8757e−001, c = −3.8287e−001,
d = 1.5204e−001
9th surface k = −3.7611e+001
a = −2.0245e−001, b = −2.3268e−002, c = 1.2746e−001,
d = 1.1058e−001, e = −2.3861e−001

-continued

Unit mm

10th surface k = −2.1643e+002
a = 2.1911e−002, b = −5.4176e−001, c = 1.3602e+000,
d = −1.2114e+000
11th surface k = −9.6108e+002
a = 1.5497e−001, b = −4.0951e−001, c = 1.0064e+000,
d = −6.0425e−001
12th surface k = −1.4896e+000
a = −5.4856e−003, b = 8.9888e−002, c = −1.2373e−001,
d = 4.2339e−001

| Focal length | 3 |
| NA | 0.21 |
| WD | 0.79 |
| Maximum image height | 0.18 |

Example 6

Unit mm

Surface data

| Surface no. | r | d | nd | vd |
|---|---|---|---|---|
| 1 (ob) | ∞ | 0.17 | 1.5163 | 64.1 |
| 2 | ∞ | 1.28 | | |
| 3* | −2.83 | 0.51 | 1.5337 | 55.9 |
| 4* | 4.41 | 0.68 | | |
| 5* | 1.62 | 0.67 | 1.5240 | 50.4 |
| 6* | 5.16 | 0.62 | 1.6170 | 27.2 |
| 7* | 4.79 | 0.82 | | |
| 8* | −3.80 | 0.35 | 1.6142 | 25.6 |
| 9* | 59.08 | 0.08 | | |
| 10* | 6.36 | 1.22 | 1.5337 | 60.9 |
| 11* | −2.35 | | | |

Aspherical surface data

3rd surface k = −1.2054e+001
a = 2.1887e−002, b = −2.7506e−003, c = 3.8796e−004,
d = −1.9352e−005, e = 8.2592e−009, f = 1.3377e−008
4th surface k = 0.0000e+000
a = 6.8448e−003, b = 3.3012e−004, c = −3.2337e−004,
d = 1.9812e−005
5th surface k = −2.1483e+000
a = 2.7806e−004, b = 6.8437e−003, c = −2.0949e−003,
d = 1.9903e−004
6th surface k = −1.4101e−001
a = −1.3732e−003, b = 2.5922e−003, c = 5.7859e−004,
d = −2.7593e−005
7th surface k = 1.0316e+001
a = 6.9840e−003, b = 3.6586e−004, c = −1.4058e−003,
d = 1.0346e−003
8th surface k = 4.3350e+000
a = −2.6018e−003, b = 1.0618e−003, c = 4.4617e−004,
d = −1.6020e−003, e = 1.4011e−004

-continued

Unit mm

9th surface k = 2.1330e−003
a = 3.5192e−003, b = 1.8813e−003, c = 4.8401e−004,
d = −4.2478e−004

10th surface k = 1.8617e+000
a = 1.0490e−002, b = 7.5218e−003, c = 2.1415e−003,
d = 1.0498e−003

11th surface k = −9.0499e−001
a = −1.2710e−003, b = 5.2158e−004, c = 1.3057e−003,
d = 1.9679e−003

| Focal length | 5.5 |
|---|---|
| NA | 0.18 |
| WD | 1.28 |
| Maximum image height | 0.34 |

Example 7

Unit mm

Surface data

| Surface no. | r | d | nd | vd |
|---|---|---|---|---|
| 1 (ob) | ∞ | 0.17 | 1.5163 | 64.1 |
| 2 | ∞ | 0.59 | | |
| 3* | 10.95 | 0.79 | 1.5307 | 55.7 |
| 4* | 1.69 | 0.69 | | |
| 5* | 1.67 | 0.34 | 1.6035 | 28.2 |
| 6* | 2.67 | 0.42 | | |
| 7* | 19.62 | 0.34 | 1.6035 | 28.2 |
| 8* | −19.55 | 0.27 | | |
| 9* | −1.42 | 0.32 | 1.6349 | 23.9 |
| 10* | −5.84 | 0.06 | | |
| 11* | 6.06 | 0.54 | 1.5307 | 55.7 |
| 12* | −1.42 | | | |

Aspherical surface data

3rd surface k = −6.3632e+002
a = 2.2479e−002, b = 1.6472e−003, c = 4.9949e−004,
d = −7.5157e−005

4th surface k = −1.1119e+000
a = −6.1610e−002, b = 7.8423e−003, c = −7.2282e−004,
d = 4.7832e−005

5th surface k = 3.3226e−001
a = −6.5088e−002, b = −2.7263e−002, c = 5.5793e−003,
d = −2.7152e−003

6th surface k = 9.1460e−001
a = 4.9709e−002, b = 7.5524e−003, c = 3.0336e−003,
d = 2.8298e−002

7th surface k = 1.0177e+002
a = 7.2606e−002, b = 9.2291e−003, c = −1.2539e−001,
d = −4.5273e−002

-continued

Unit mm

8th surface k = 4.1914e+001
a = 8.2723e−002, b = 6.5511e−002, c = −3.3606e−001,
d = 1.9090e−001

9th surface k = −9.1829e−002
a = 1.7279e−001, b = −3.0575e−001, c = 2.8927e−001,
d = −1.9949e−001

10th surface k = −1.7463e+002
a = −5.1617e−002, b = 6.2326e−002, c = −1.6727e−001,
d = 4.5229e−002

11th surface k = −1.1751e+001
a = −7.9690e−002, b = 1.0223e−001, c = −1.2552e−001,
d = −5.6534e−003

12th surface k = −1.1700e−001
a = 1.2533e−003, b = 7.2215e−003, c = 2.6487e−002,
d = −3.5646e−002

| Focal length | 4.3 |
|---|---|
| NA | 0.20 |
| WD | 0.59 |
| Maximum image height | 0.26 |

Example 8

Unit mm

Surface data

| Surface no. | r | d | nd | vd |
|---|---|---|---|---|
| 1 (ob) | ∞ | 0.17 | 1.5163 | 64.1 |
| 2 | ∞ | 1.04 | | |
| 3* | −1.58 | 0.50 | 1.5337 | 55.9 |
| 4* | 6.32 | 0.32 | | |
| 5* | 1.13 | 0.53 | 1.5240 | 50.4 |
| 6* | 5.38 | 0.40 | 1.6170 | 27.2 |
| 7* | 4.14 | 0.63 | | |
| 8* | −2.88 | 0.35 | 1.6142 | 25.6 |
| 9* | 14377.94 | 0.05 | | |
| 10* | 5.97 | 1.08 | 1.5337 | 55.9 |
| 11* | −1.86 | | | |

Aspherical surface data

3rd surface k = −9.4343e+000
a = 5.5641e−002, b = −1.3690e−002, c = 3.1786e−003,
d = −2.7276e−004, e = −9.7009e−007, f = 9.6475e−007, 4th surface k = 0.0000e+000
a = 5.0196e−002, b = −5.2961e−003, c = −2.4022e−003,
d = 3.5040e−004, 5th surface k = −3.4281e+000
a = 6.3824e−002, b = −1.0565e−002, c = 3.1794e−003,
d = −2.3892e−003

6th surface k = 1.2640e+001
a = −6.4902e−003, b = 1.7414e−002, c = 1.8720e−002,
d = −1.2693e−002

-continued

| Unit mm |
|---|

7th surface k = 1.1806e+001
a = 2.5099e−003, b = 2.1903e−002, c = −8.9325e−003,
d = 8.0857e−004

8th surface k = −6.3806e−001
a = −1.5003e−003, b = 7.3876e−004, c = 4.2816e−003,
d = −1.8874e−002, e = 5.0296e−003

9th surface k = −1.0000e−006
a = 6.1011e−002, b = 1.7715e−002, c = −1.8570e−002,
d = −1.7626e−003

10th surface k = −1.1323e+000
a = 4.7125e−002, b = 2.1068e−002, c = −9.0519e−003,
d = 6.5676e−003

11th surface k = −6.0790e−001
a = −5.3781e−003, b = 1.3085e−002, c = −1.9077e−002,
d = 1.8726e−002

| | |
|---|---|
| Focal length | 4.2 |
| NA | 0.24 |
| WD | 1.04 |
| Maximum image height | 0.26 |

Example 9

| Unit mm | | | | |
|---|---|---|---|---|
| Surface data | | | | |
| Surface no. | r | d | nd | vd |
| 1 (ob) | ∞ | 0.17 | 1.5163 | 64.1 |
| 2 | ∞ | 0.89 | | |
| 3* | −0.90 | 0.38 | 1.5346 | 56.2 |
| 4* | 4.23 | 0.24 | | |
| 5* | 0.77 | 0.48 | 1.5346 | 56.2 |
| 6* | 3.40 | 0.10 | | |
| 7* | 8.35 | 0.25 | 1.5346 | 56.2 |
| 8* | −10.21 | 0.19 | | |
| 9* | −8.16 | 0.31 | 1.5346 | 56.2 |
| 10* | −4.37 | 0.13 | | |
| 11* | −2.47 | 0.27 | 1.6142 | 25.6 |
| 12* | 11.08 | 0.04 | | |
| 13* | 10.28 | 0.42 | 1.5346 | 56.2 |
| 14* | −1.54 | | | |

Aspherical surface data

3rd surface k = −7.2952e+000
a = 8.2593e−002, b = −3.8628e−002, c = 1.1216e−002,
d = −1.6482e−003, e = 9.3301e−005, f = 9.1826e−007

4th surface k = −8.4623e+001
a = 1.0703e−001, b = −4.8837e−002, c = 3.2315e−003,
d = 1.2418e−003, e = −3.7604e−005, f = −2.2653e−005

5th surface k = −3.5235e+000
a = 7.4952e−002, b = −1.0607e−001, c = −3.4672e−002,
d = 5.2016e−002, e = −1.0626e−002

-continued

| Unit mm |
|---|

6th surface k = −9.7572e+000
a = 2.0008e−002, b = −2.0028e−002, c = 6.8054e−004,
d = 7.8958e−002, e = −3.9562e−002

7th surface k = 1.2957e+002
a = −6.6967e−002, b = −3.9484e−001, c = −4.2037e−001,
d = 1.2865e+000

8th surface k = −1.8875e+003
a = −1.3204e−001, b = −2.6347e−001, c = −3.8328e−001,
d = 6.9353e−001

9th surface k = −1.1737e+003
a = 1.5225e−001, b = 8.2861e−002, c = 2.6467e−001,
d = −1.5780e+000

10th surface k = −1.9604e+002
a = 1.4629e−001, b = 3.8230e−001, c = −5.7452e−001,
d = −4.8968e−001

11th surface k = −3.7611e+001
a = −2.0245e−001, b = −2.3268e−002, c = 1.2746e−001,
d = 1.1058e−001, e = −2.3861e−001

12th surface k = −2.1643e+002
a = 2.1911e−002, b = −5.4176e−001, c = 1.3602e+000,
d = −1.2114e+000

13th surface k = −9.6108e+002
a = 1.5497e−001, b = −4.0951e−001, c = 1.0064e+000,
d = −6.0425e−001

14th surface k = −1.4896e+000
a = −5.4856e−003, b = 8.9888e−002, c = −1.2373e−001,
d = 4.2339e−001

| | |
|---|---|
| Focal length | 3 |
| NA | 0.21 |
| WD | 0.89 |
| Maximum image height | 0.18 |

| Imaging lens | | | | |
|---|---|---|---|---|
| Surface no. | r | d | nd | vd |
| 1 | 68.75 | 7.73 | 1.4875 | 70.2 |
| 2 | −37.57 | 3.47 | 1.8061 | 40.9 |
| 3 | −102.85 | 0.70 | | |
| 4 | 84.31 | 6.02 | 1.8340 | 37.2 |
| 5 | −50.71 | 3.03 | 1.6445 | 40.8 |
| 6 | 40.66 | | | |

| | |
|---|---|
| Focal length | 180 |

Aberration diagrams of the embodiments from the first embodiment to the ninth embodiment are shown in FIG. 2A to FIG. 2D, FIG. 4A to FIG. 4D, FIG. 6A to FIG. 6D, FIG. 8A to FIG. 8D, FIG. 10A to FIG. 10D, FIG. 12A to FIG. 12D, FIG. 14A to FIG. 14D, FIG. 16A to FIG. 16D, and FIG. 18A to FIG. 18D. In each of the abovementioned aberration diagrams, 'NA' denotes a numerical aperture on the object side and 'FIY' denotes the maximum image height. An aberration in each of the aberration diagrams of the embodiments from the first embodiment to the ninth embodiment is an aberration at an object surface (specimen surface) when a light ray is made to be incident from a tube-lens side.

Figure 4A:
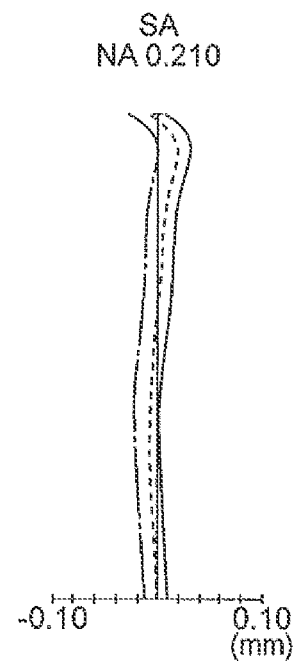
FIG. 4A, FIG. 4B, FIG. 4C, and FIG. 4D (hereinafter, 'FIG. 4A to FIG. 4D') are aberration diagrams of the microscope objective lens according to the second embodiment.
Figure 4B:
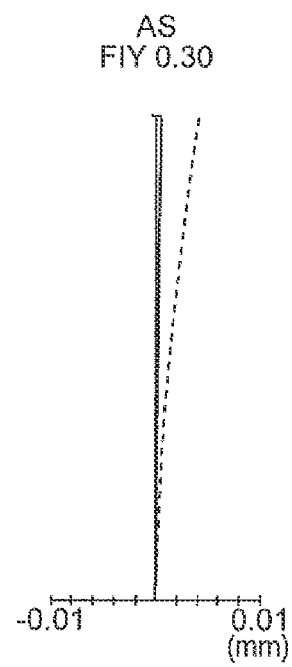
Figure 4C:
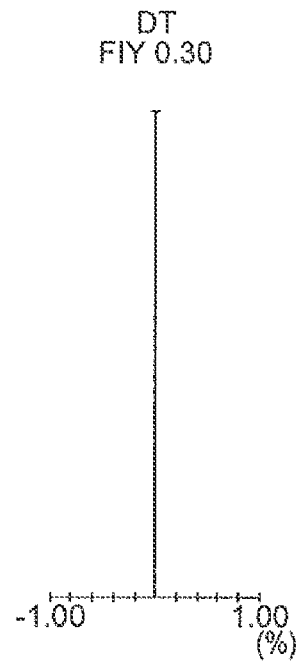
Figure 4D:
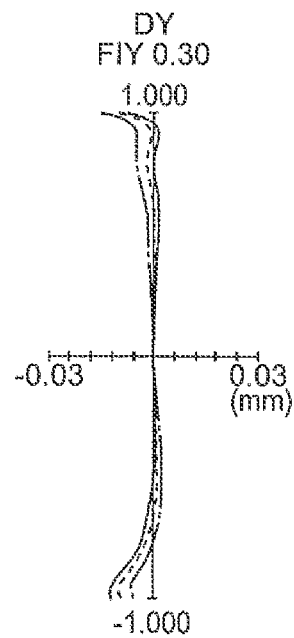
Figure 6A:
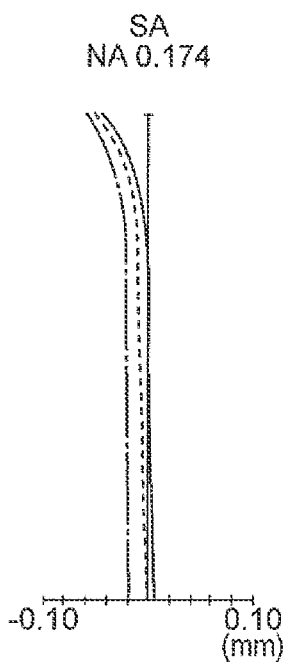
FIG. 6A, FIG. 6B, FIG. 6C, and FIG. 6D (hereinafter, 'FIG. 6A to FIG. 6D') are aberration diagrams of the microscope objective lens according to the third embodiment.
Figure 6B:
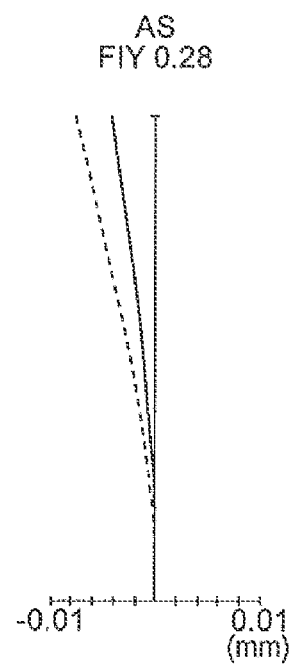
Figure 6C:
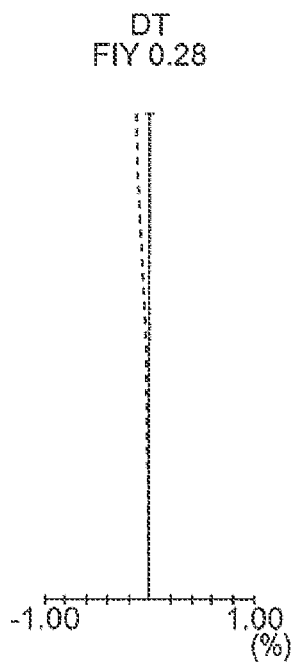
Figure 6D:
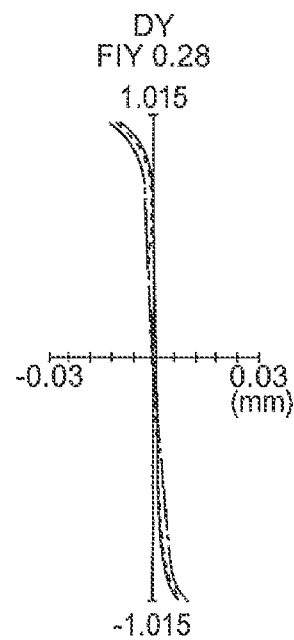
Figure 18A:
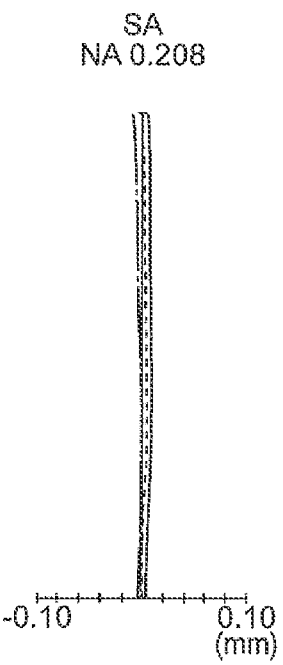
FIG. 18A, FIG. 18B, FIG. 18C, and FIG. 18D (hereinafter, 'FIG. 18A to FIG. 18D') are aberration diagrams of the microscope objective lens according to the ninth embodiment.
Figure 18B:
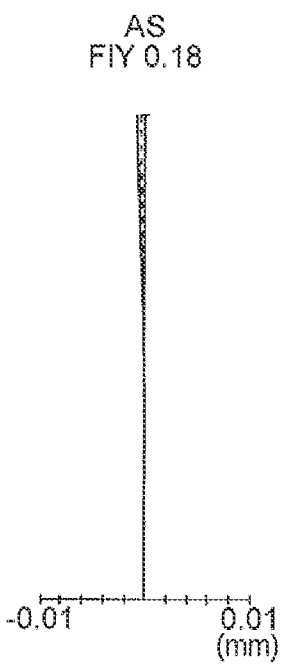
Figure 18C:
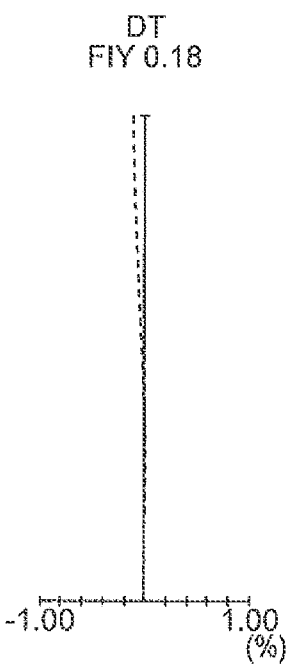
Figure 18D:
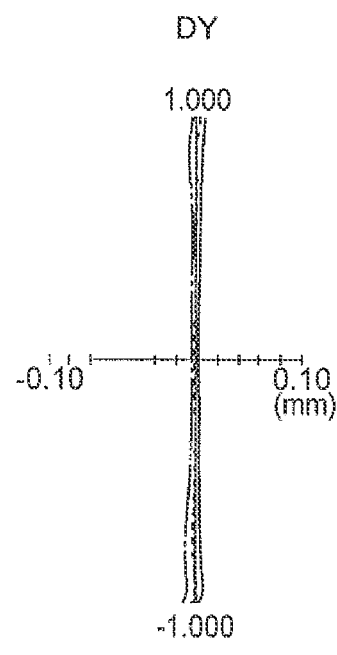

In the abovementioned aberration diagrams, diagrams which are assigned numbers with suffix A, such as FIG. 2A, FIG. 4A, FIG. 6A, ..., FIG. 18A show spherical aberration (SA), diagrams which are assigned numbers with suffix B, such as FIG. 2B, FIG. 4B, FIG. 6B, ..., FIG. 18B show astigmatism (AS), diagrams which are assigned numbers with suffix C, such as FIG. 2C, FIG. 4C, FIG. 6C, ..., FIG. 18C show distortion (DT), and diagrams which are assigned numbers with suffix D, such as FIG. 2D, FIG. 4D, FIG. 6D, ..., FIG. 18D show off-axis transverse aberration (DY).

Next, value of conditional expressions (1)-(2) are shown below:

| Conditional expressions | Example 1 | Example 2 | Example 3 |
|---|---|---|---|
| (1), (1A) | −0.63 | −0.52 | −0.50 |
| (2) | 0.93 | 1.10 | 1.41 |
| Conditional expressions | Example 4 | Example 5 | Example 6 |
| (1), (1A) | −16.83 | −0.45 | −0.57 |
| (2) | 1.39 | 0.79 | 1.28 |
| Conditional expressions | Example 7 | Example 8 | Example 9 |
| (1), (1A) | −0.90 | −0.55 | −0.45 |
| (2) | 0.59 | 1.04 | 0.89 |

FIG. 19 is a cross-sectional view of the tube lens. FIG. 20 is a lens cross-sectional view when the tube lens and the microscope objective lens according to the first embodiment are combined.

Figure 21:
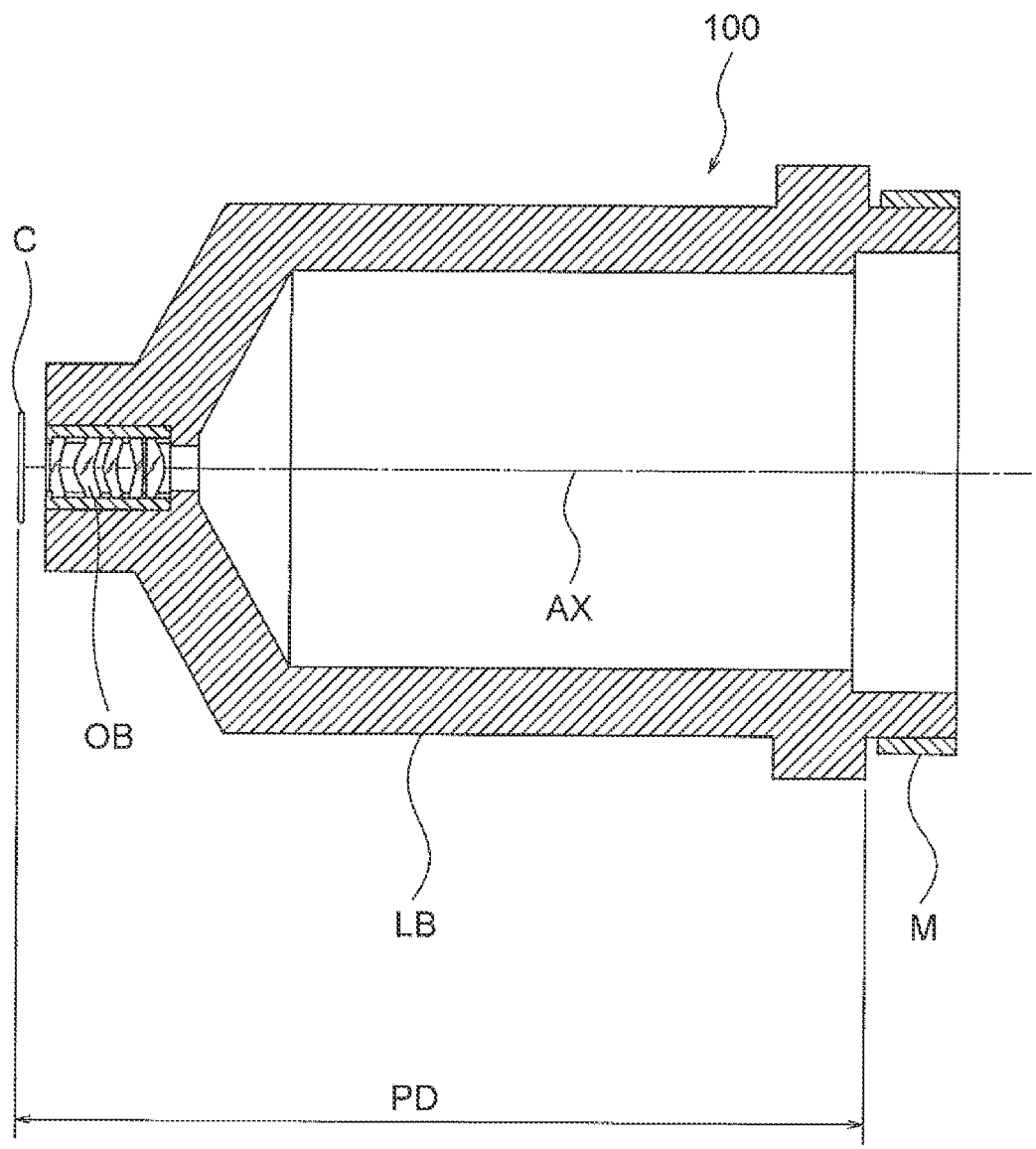
FIG. 21 is a cross-sectional view of a microscope objective lens unit.

FIG. 21 is a cross-sectional view of a microscope objective lens unit 100. The microscope objective lens unit 100 includes a lens barrel LB, a microscope objective lens OB which is accommodated in one end portion of the lens barrel LB, and a detaching portion M which is formed at the other end of the lens barrel LB, and is detachable from the observation apparatus.

In FIG. 21, PD denotes a parfocalizing distance. The parfocalizing distance of the microscope objective lens is stipulated by Japanese Industrial Standards (JIS). Concretely, in a case of no cover glass, the parfocalizing distance is stipulated to be PD=45+15 m (m=−1, 0, 1, 2, 3, 4). In a case of having a cover glass, the parfocalizing distance is given by adding t (n−1/n) to the parfocalizing distance PD in the case of no cover glass. For instance, in a case in which, the parfocalizing distance is 45 mm, PD is stipulated to be PD=[45+t (n−1/n)]. Here, t denotes the thickness of the cover glass, and n denotes the refractive index of the cover glass.

In the microscope objective lens according to the first embodiment, since a length from a first lens up to a fifth lens is 4.21 mm, in a case in which, the parfocalizing distance is 45 mm for example, a proportion in the parfocalizing distance of the microscope objective lens according to the first embodiment becomes 1/10 approximately. In such manner, the microscope objective lens according to the present invention has a length of an optical system which is shorter than a length of an optical system in a conventional microscope objective lens.

In FIG. 21, a scale of an objective lens, and a scale of a holding member which holds the objective lens are not same.

Moreover, for the objective lens of the present invention, in the abovementioned embodiments, although lenses which do not have a refractive index practically have been disposed, these lenses may not be disposed necessarily. Moreover, conversely, lenses which are not shown in the abovementioned diagrams, and which do not have a refractive index practically may be disposed.

As it has been described above, the microscope objective lens according to the present invention is useful from a point that it is possible to suppress a loss of amount of light which is incident.

According to the present invention, it is possible to provide a microscope objective lens in which, the loss of amount of light which is incident is small.

What is claimed is:

1. A microscope objective lens comprising:
an aspheric-surface lens, wherein
a first lens nearest to an object side is a negative lens, wherein
a lens which forms the microscope objective lens is made of at least two types of glass, and
a refractive index of the lens for a d-line is not more than 1.7.

2. The microscope objective lens according to claim 1, wherein
the first lens is a negative single lens, and each of lenses included in the microscope objective lens is single lens.

3. The microscope objective lens according to claim 1, wherein at least any one surface of the first lens nearest to the object side is an aspheric surface.

4. The microscope objective lens according to claim 1, wherein the microscope objective lens satisfies the following conditional expression (1)

$$-20 < f_1/f < -0.1 \quad (1)$$

where,
$f_1$ denotes a focal length of the first lens nearest to the object side, and
f denotes a focal length of the overall microscope objective lens system.

5. The microscope objective lens according to claim 1, wherein the microscope objective lens satisfies the following conditional expression (2)

$$0.2 \text{ mm} < WD < 3.0 \text{ mm} \quad (2)$$

where,
WD denotes a distance from a front end of the microscope objective lens up to an object.

6. The microscope objective lens according to claim 1, wherein the microscope objective lens includes three to six single lenses.

7. The microscope objective lens according to claim 1, wherein
the microscope objective lens is accommodated in a microscope objective lens unit, and
the microscope objective lens unit has a detaching portion which is detachable from an observation apparatus.

8. A microscope objective lens comprising:
an aspheric-surface lens, wherein
a first lens nearest to an object side is a negative lens, wherein a parfocalizing distance PD of the microscope objective lens is calculated by the following expression (3)

$$PD = 45 + 15 m \quad (3)$$

where,
m is −1, 0, 1, 2, 3, or 4.

* * * * *